United States Patent
Sharifi et al.

(10) Patent No.: US 9,692,301 B2
(45) Date of Patent: Jun. 27, 2017

(54) DC-DC VOLTAGE CONVERTER WITH ADAPTIVE CHARGE TRANSFERRING CAPABILITY

(71) Applicant: TEXAS INSTRUMENTS INCORPORATED, Dallas, TX (US)

(72) Inventors: Reza Sharifi, Sunnyvale, CA (US); Kevin Scoones, San Jose, CA (US); Orlando Lazaro, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 18 days.

(21) Appl. No.: 14/801,513

(22) Filed: Jul. 16, 2015

(65) Prior Publication Data

US 2017/0019023 A1   Jan. 19, 2017

(51) Int. Cl.
*H02M 3/158* (2006.01)
*H02M 1/14* (2006.01)
*H02M 1/00* (2006.01)

(52) U.S. Cl.
CPC .............. *H02M 3/158* (2013.01); *H02M 1/14* (2013.01); *H02M 2001/0032* (2013.01)

(58) Field of Classification Search
CPC .... H02M 3/156–3/158; H02M 3/1584; H02M 3/1588; H02M 2001/007; H02M 2001/009; H02M 2001/0032; H02M 2001/0045; G05F 1/56; G05F 1/565; G05F 1/573–1/575; G05F 3/24

USPC .................................................. 323/268–285
See application file for complete search history.

(56) References Cited

U.S. PATENT DOCUMENTS

| 6,396,252 | B1 * | 5/2002 | Culpepper | H02M 3/156 323/225 |
| 7,697,308 | B2 * | 4/2010 | Huynh | H02M 3/33507 323/300 |
| 8,629,669 | B2 * | 1/2014 | Tournatory | H02M 3/156 323/271 |
| 2012/0038331 | A1 | 2/2012 | Wu et al. | |
| 2013/0063104 | A1 * | 3/2013 | Gibson | H02M 3/1588 323/271 |
| 2016/0204704 | A1 * | 7/2016 | Cao | H02M 3/156 323/271 |

* cited by examiner

*Primary Examiner* — Yemane Mehari
(74) *Attorney, Agent, or Firm* — John R. Pessetto; Charles A. Brill; Frank D. Cimino

(57) ABSTRACT

A voltage converter includes a high side transistor, a low side transistor coupled to the high side transistor at a switching node, and an inductor coupled to the switching node and providing an output node. A controller is provided that is coupled to the high side transistor and the low side transistor. The controller is configured to selectively turn on and off the high and low side transistors in a repeat cycle. The controller is configured to control the high and low side transistors to cause a sequence of packets of charge to be delivered to the inductor. Also included is an adaptive timer circuit coupled to the output node and the controller and configured to adaptively adjust the amount of charge in each packet based on the voltage ripple of the output node.

2 Claims, 4 Drawing Sheets

DC-DC VOLTAGE CONVERTER WITH ADAPTIVE CHARGE TRANSFERRING CAPABILITY

BACKGROUND

A direct current (DC)-to-DC converter converts a DC input voltage to a desired DC output voltage. A buck converter is a type of DC-to-DC converter in which a controller individually toggles on and off a pair of transistors serially connected between power and ground to deliver charge to an inductor, and through the inductor to a capacitor. In order to preserve efficiency, some DC-DC converters adapt to different load conditions. Some DC-to-DC converters are configured to distinguish light-load and high-load conditions. Under high-load conditions, a buck converter may operate in a "continuous" operating mode in which the one or the other of the pair of transistors is on at all times. Under light-load conditions, some buck converters enter a "discontinuous/pulse frequency" operating mode. In the discontinuous/pulse frequency operating mode, the DC-DC converter becomes active when the output voltage falls below a certain threshold voltage level. During the discontinuous/pulse frequency mode, the inductor current falls to zero during a part of each cycle in which neither transistor is on. Buck converters may change from the continuous operating mode to the discontinuous/pulse frequency operating mode when load current reduces sufficiently. When load current increases, the converter may switch back to the continuous operating mode.

SUMMARY

A voltage converter includes an adaptive charge transferring capability. The amount of electric charge delivered to an output capacitor in the voltage converter is increased to increase efficiency during a discontinuous/pulse-frequency operating mode, while preventing the magnitude of the output ripple from becoming excessive. Thus, the size of packets of electric charge are increased in an iterative fashion while monitoring the output voltage. When the output voltage ripple reaches a threshold level, the packet size is not increased further.

In one embodiment, a voltage converter includes a high side transistor, a low side transistor coupled to the high side transistor at a switching node, and an inductor coupled to the switching node and providing an output node. A controller is provided that is coupled to the high side transistor and the low side transistor. The controller is configured to selectively turn on and off the high and low side transistors in a repeat cycle. The controller is configured to control the high and low side transistors to cause a sequence of packets of energy to be delivered to the inductor. Also included is an adaptive timer circuit coupled to an input node and the output node and the controller and configured to adaptively adjust the amount of energy in each packet based on the voltage ripple of the output node.

In another embodiment, a method includes delivering a first packet of electric charge via an inductor to an output capacitor, monitoring a magnitude of an output voltage ripple of a voltage converter upon delivering the packet, and adjusting a packet size based on the magnitude of the output voltage ripple. The method may further include delivering an additional second packet of electric charge to the inductor in accordance with the adjusted packet size, the second packet of electric charge having a different amount of electric charge than the first packet.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

Figure 1:
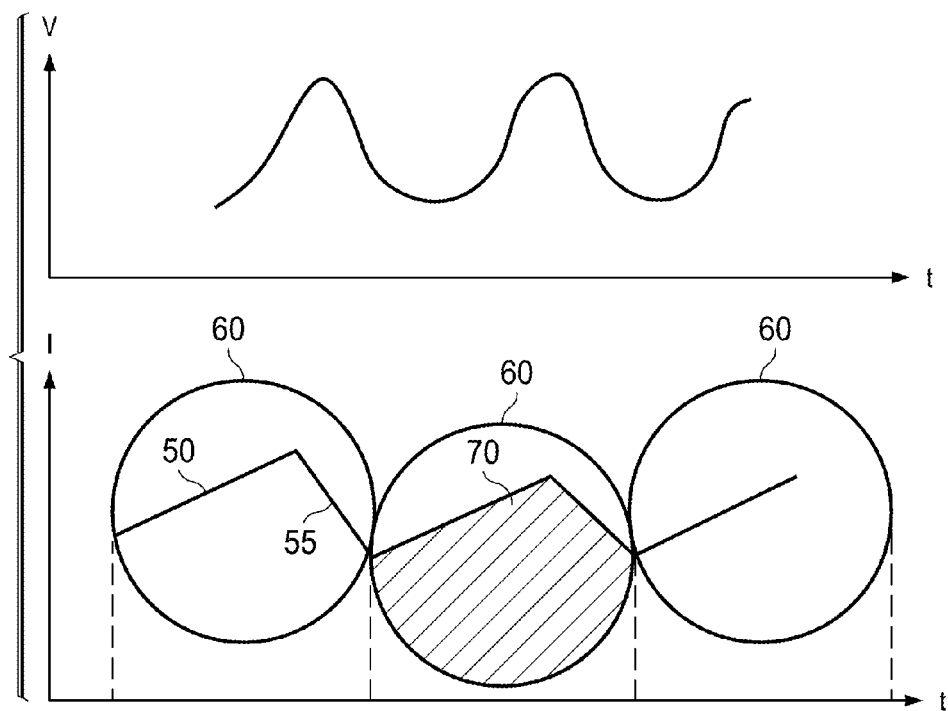
FIG. 1 illustrates voltage and current waveforms during a continuous operating mode of a voltage converter in accordance with various examples.

Some DC-to-DC converters have a high side switch (e.g., a field effect transistor) and a low side switch whose states are controlled by a controller. A switch node (the connection point between the switches) is coupled to an inductor. The opposite terminal of the inductor represents the output node of the converter and may be connected to a capacitor and a load. Many such DC-to-DC converters have a continuous operating mode and a discontinuous operating mode as noted above. In the continuous operating mode, the converter's controller operates in a pulse width modulation (PWM) mode in which one of the two switches are on at any point in time. The duty cycle of the operation of the switches is controlled by the controller. When the high side switch is on, the switch node is pulled high thereby causing an increase in the current to the inductor, as indicated at 50 in FIG. 1. When the load side switch is on, the current through the inductor begins to decrease as indicated at 55. As a result of the reciprocal operation of the high and low side switches, the inductor current waveform is triangular in nature as shown. During each cycle of the high and low side switch operation, charge is delivered to the inductor. FIG. 1 shows three such cycles 60. The amount of charge is represented by the area under the current curve as shown by the shading at 70 in FIG. 1 for one of the cycles 60. A ripple also can be seen on the output voltage waveform.

Figure 2:
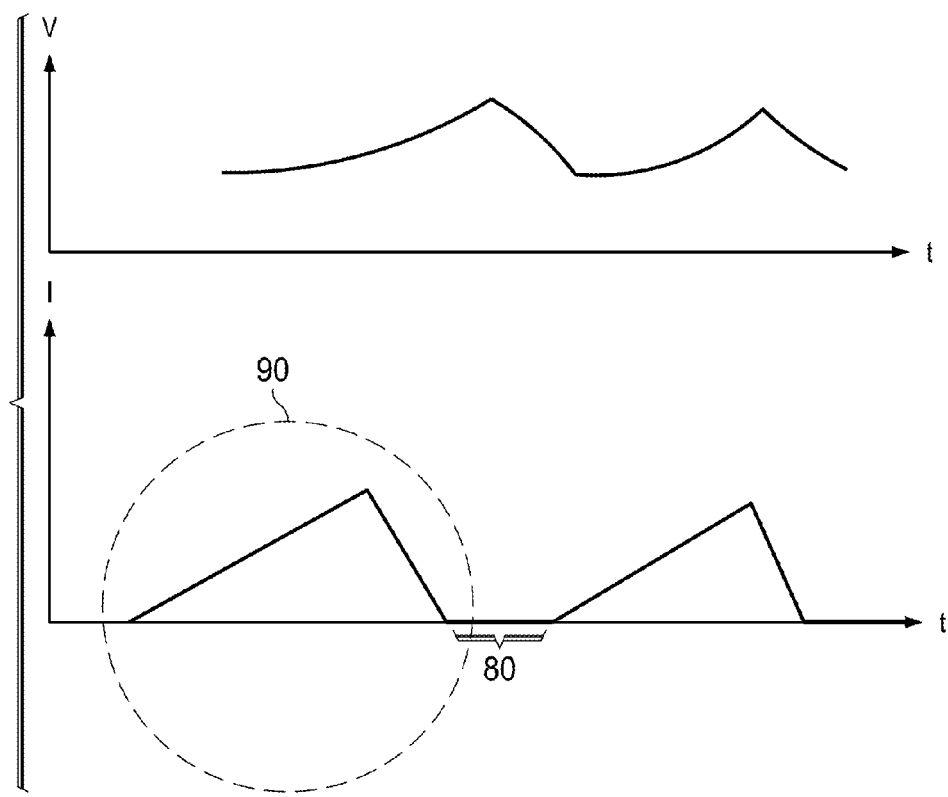
FIG. 2 illustrates voltage and current waveforms during a discontinuous operating mode of a voltage converter in accordance with various examples.

The discontinuous/pulse-frequency operating mode, as illustrated in FIG. 2, is characterized by packets 90 of charge that are delivered to the inductor less frequently. A time period 80 is provided during each cycle during which neither the high nor low side switch is on.

The discontinuous/pulse-frequency operating mode is generally a better mode of operation in terms of efficiency at lighter loads, but to further improve efficiency, the discontinuous/pulse-frequency can be implemented to produce larger ripple on the output voltage as can be seen by comparing the voltage ripples of FIGS. 1 and 2. Larger ripple voltage can undesirably introduce electrical noise and potential reliability concerns and can also generate an audible noise. The ripple voltage can be reduced by delivering smaller charge packets more frequently, but doing so results in a reduction of efficiency of the converter. Efficiency can be improved with larger, less frequently delivered charger packets but that results in larger voltage ripple which may be undesirable.

In accordance with the disclosed embodiments a DC-to-DC voltage converter provides a continuous mode of operation and a discontinuous/pulse-frequency mode of operation. During the discontinuous/pulse-frequency mode of operation, the voltage converter adaptively increases the size of charge packets to be delivered to the inductor while maintaining the magnitude of the output voltage at or below a threshold. The disclosed DC-to-DC voltage converter includes an adaptive timer circuit which, during the discontinuous/pulse-frequency operating mode, adaptively adjusts the amount of charge in each packet based on the voltage ripple of the output node. The adaptive timer circuit causes the size of each energy packet 90 to be increased as much as possible while preventing the output voltage ripple from exceeding a threshold. In one embodiment, the length of time of the packet is increased to increase the amount of charge of each such packet. The magnitude of the output voltage ripple is, in part, a function of the output capacitance of the voltage converter. The output capacitance is a function, in part, of the load powered by the converter. Different loads may have different capacitance values from the perspective of the DC-to-DC converter. The adaptive timer circuit is based on a minimum supported value of output capacitance. However, larger values of output capacitance tend to reduce the magnitude of the output voltage ripple. The adaptive timer circuit in the converter responds to higher output capacitance values by increasing the size of each charge packet, and thus the amount of charge delivered in each packet to improve efficiency. The adaptive timer circuit monitors the voltage ripple on the output node and causes the size of the charge packets to be increased until the output voltage begins to exceed a threshold voltage reference.

Figure 3:
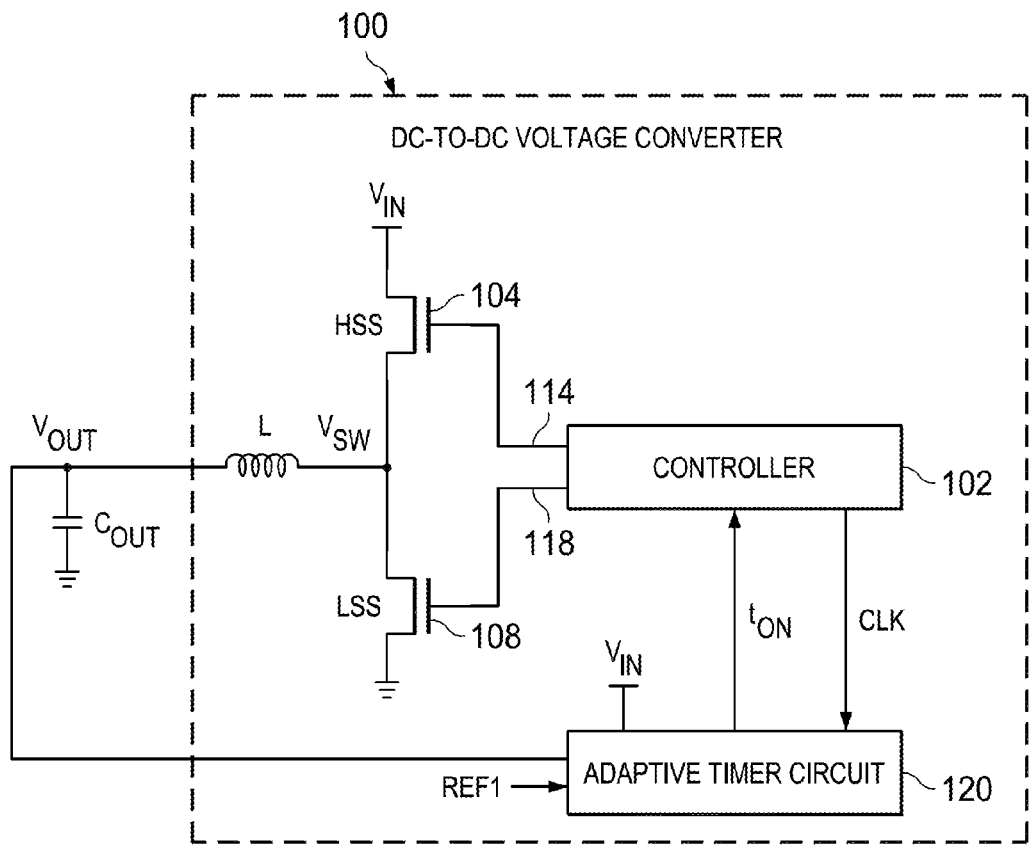
FIG. 3 is a block diagram of the voltage converter including an adaptive timer circuit in accordance with various examples.

FIG. 3 shows an example of a DC-to-DC voltage converter 100 in accordance with various embodiments. The DC-to-DC voltage converter 100 (also referred to herein as a "voltage converter" or simply a "converter") includes an inductor L, a high side (HS) switch 104, a low side (LS) switch 108, a controller 102, and an adaptive timer circuit 120. An output capacitor Cout also is shown on the output voltage node ($V_{out}$). $C_{out}$ may be a capacitor in the converter and/or may represent a capacitance of a load coupled to the output voltage node $V_{out}$. Different loads may be powered by converter 100, and thus varying amounts of capacitance Cout may be coupled to the converter.

An input voltage $V_{in}$ is converted to the output voltage $V_{out}$ by the converter 100. The input voltage $V_{in}$ is provided to the HS switch 104. The HS switch 104 is connected to the LS switch 108 at a switch node $V_{sw}$ and the LS switch also is connected to ground. The converter 100 is configured to operate in a continuous operating mode (for higher load conditions) and a discontinuous operating mode (for lighter load conditions). During the continuous operating mode (higher load conditions), the controller 102 asserts control lines 114 and 118 to selectively turn on and off HS switch 104 and LS switch 108. The controller 102 controls the duty cycle of the switching of the HS switch and LS switch so as to cause the magnitude of the output voltage $V_{out}$ to be a particular value, generally lower than the input voltage $V_{in}$.

At lighter load levels, the controller 102 may switch to the discontinuous operating mode. The adaptive timer circuit 120 receives a clock pulse (CLK) each time the controller causes a packet of energy to be delivered via inductor L. The clock pulse causes the adaptive timer circuit 120 to sample the output voltage $V_{out}$ and to compare the output voltage to a voltage reference, REF1. The adaptive timer circuit 120 is configured to cause the controller 102 to vary the amount of charge delivered by the packets via the inductor L by providing a $t_{on}$ pulse to the controller 120. The $t_{on}$ pulse is of a length dictated by the adaptive timer circuit based, in part, on the magnitude of the output voltage ripple. For each packet of charge caused to be produced by controller 102, the controller 102 adjusts the time length of each such packet based on the length of each $t_{on}$ pulse. By varying the time length of each packet of energy, the amount of charge delivered via the inductor L can be varied.

The adaptive timer circuit 120 incrementally increases the length of the $t_{on}$ pulse for each subsequent packet of charge delivered to the inductor L, while monitoring the output voltage ripple. As the amount of charge of each packet is increased (due to operation of the adaptive timer circuit 120), the output voltage ripple increases. The adaptive timer circuit 120 samples the output voltage $V_{out}$ after each packet is delivered. If the output voltage is less than a predefined threshold (indicating the output voltage ripple is within an acceptable range), the adaptive timer circuit 120 again increases the length of the $t_{on}$ pulse. The predetermined threshold is REF1. This process repeats until the output voltage exceeds the threshold for a maximum level of voltage ripple. At that point, the adaptive timer circuit 120 reduces the length of the $t_{on}$ pulse so that the amount of charge delivered in the next packet is lower and thus the ripple on the output voltage $V_{out}$ will be below the maximum acceptable limit.

Figure 4:
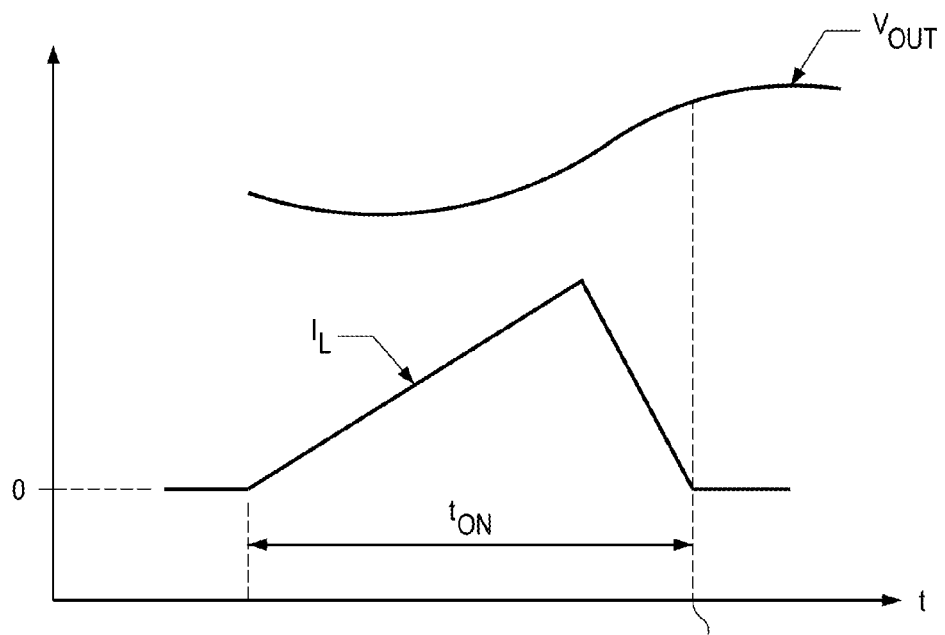
FIG. 4 illustrates adaptive timing for packets of charge produced by the voltage converter in accordance with various examples.

FIG. 4 illustrates waveforms for output voltage $V_{out}$ and inductor current $I_L$ for one packet of charge. The $t_{on}$ period of time is shown during the linear increase in inductor current. Reference numeral 130 identifies the point in time at which the output voltage is sampled. The $t_{on}$ period of time is given by the following equation:

$$t_{on} = \frac{\sqrt{2V_{ripple}C_{out}L(V_{out} - V_{in})}}{V_{in}}$$

where $V_{ripple}$ is the output voltage ripple.

Figure 5:
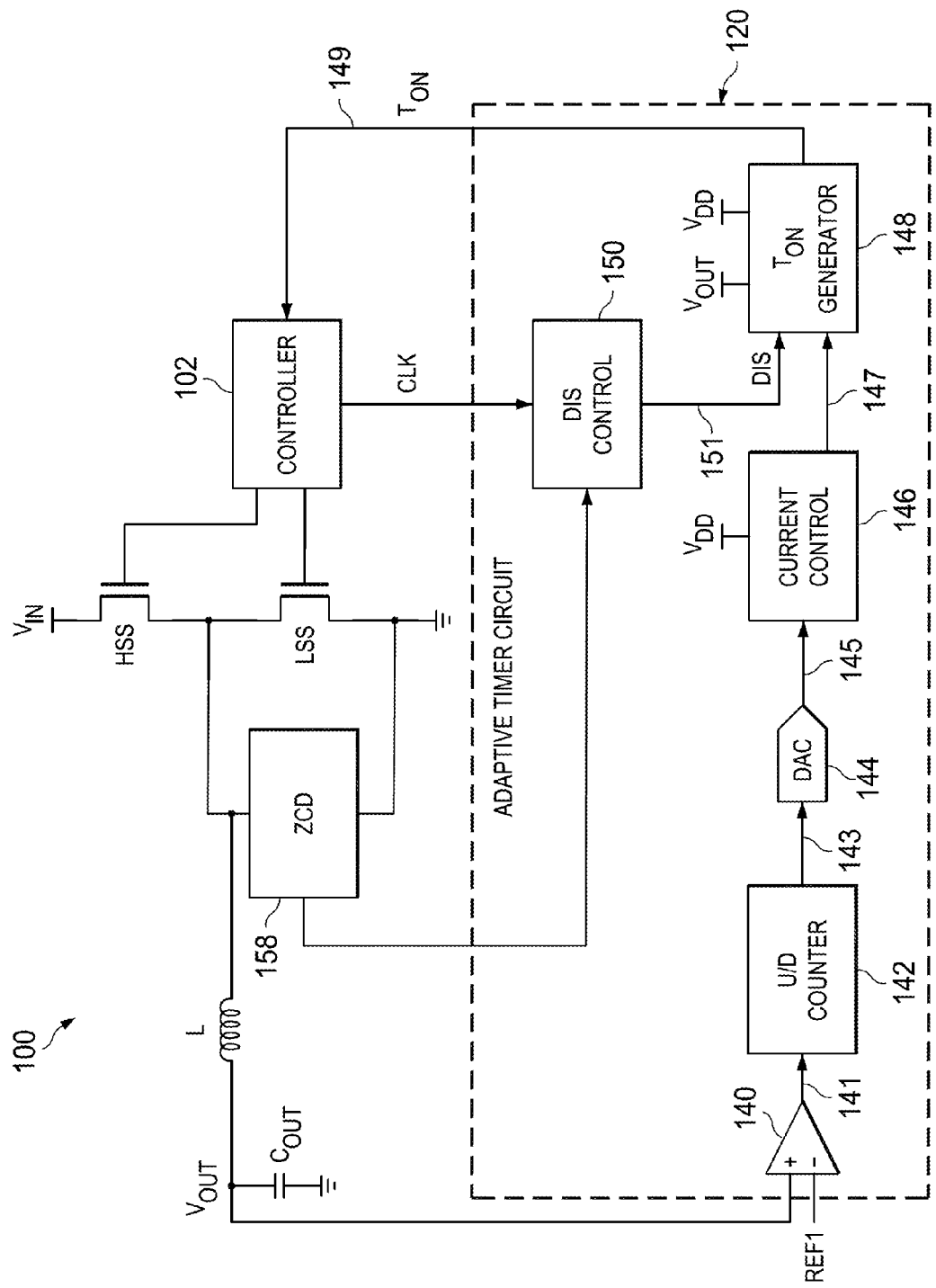
FIG. 5 illustrates additional detail of the adaptive timer circuit of the voltage converter in accordance with various examples.

FIG. 5 shows another embodiment of the voltage converter 100. In this example, the adaptive timer circuit 120 is shown to include a comparator 140, an up/down (U/D) counter 142, a digital-to-analog converter (DAC) 144, a current control 146, a $T_{on}$ generator 148, and a disable (DIS)

control 150. The comparator 140 is coupled to the output voltage node and compares the output voltage $V_{out}$ to reference voltage REF1. If $V_{out}$ is less than REF1, the output signal 141 of the comparator 140 will be a logic low, and if $V_{out}$ is greater than REF1, the comparator's output signal 141 will be a logic high. The comparator's output signal causes the up/down counter 142 to count up or down depending on the logic state of signal 141. The output count value 143 from the up/down counter 142 is provided to the DAC 144 which converts the digital count value to an analog signal 145, which is provided to the current control 146.

The current control 146 adds or subtracts current into the $T_{on}$ generator 148 through signal line 147. The more current that the current control 146 provides to the $T_{on}$ generator 148, the longer will be the length of the $t_{on}$ pulse provided on the $t_{on}$ signal line 149 to controller 102. A decrease in current to the $T_{on}$ generator 148 will cause the $T_{on}$ generator 148 to generate a shorter pulse on the $t_{on}$ signal line 149 to controller 102.

The DIS signal 151 is asserted by the DIS control 150. DIS 151 is high between packets, and is asserted low during at least the $t_{on}$ period of time. In other embodiments, the polarity of DIS can be the opposite (normally low, and asserted high during the $t_{on}$ period of time). The DIS control 150 receives a clock (CLK) signal from controller 102 upon the controller 102 causing a charge packet to be generated. The clock signal causes the DIS control 150 to force DIS 151 to a logic low level. The U/D counter 142 is caused to adjust its count value when a packet has completed (130 in FIG. 4). DIS will remain low until at least until the end of the $t_{on}$ period of time. In the example of FIG. 5, a zero-crossing detection circuit 158 is provided coupled to the LS switch. The zero-crossing detection circuit 158 monitors the drain-to-source voltage of the LS switch. The zero-crossing detection circuit 158 asserts a signal to DIS control 150 when the LS switch's drain-to-source voltage becomes zero, or approximately zero, due to LS switch being turned on by controller 102. The DIS control 150 responds by deasserting DIS 151 (e.g., pulling DIS back to its nominal high logic state). DIS 151 is a signal that controls the operation of the $T_{on}$ generator 148 to thereby generating the $T_{on}$ signal pulse on signal line 149 to the controller 102.

Figure 6:
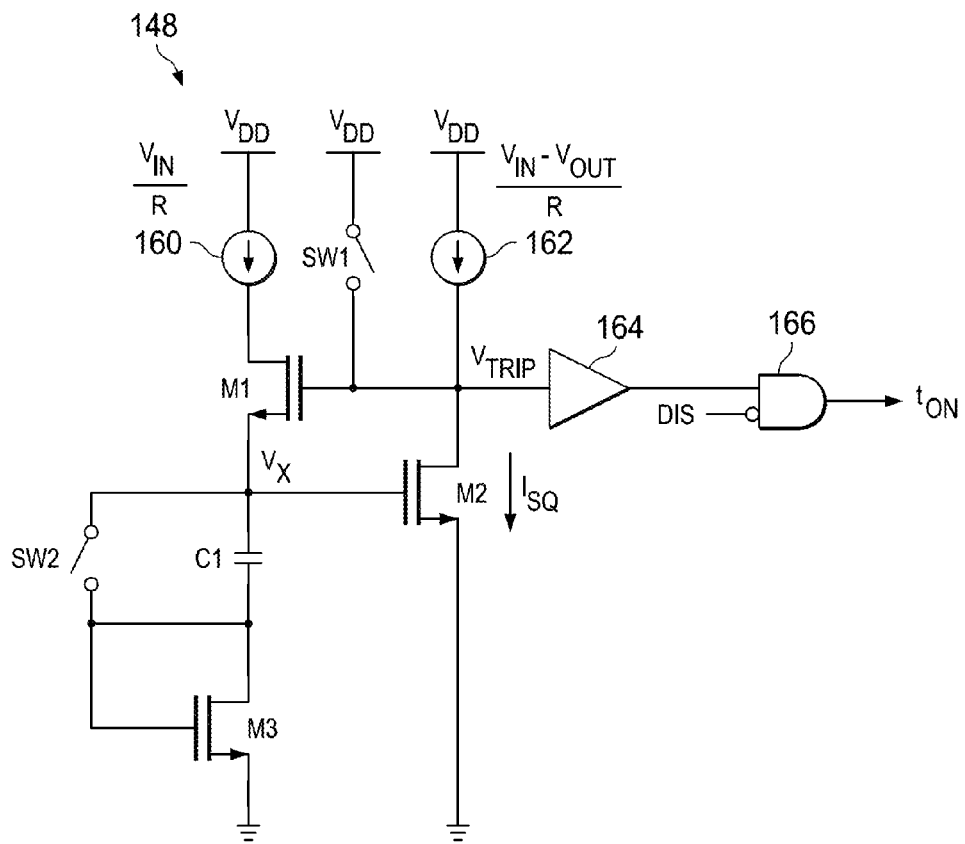
FIG. 6 shows an embodiment of a portion of the adaptive timer circuit in accordance with various examples.

FIG. 6 is one example of the $T_{on}$ generator 148. As shown, the $T_{on}$ generator 148 includes current sources 160 and 162, switches SW1 and SW2 (which may be implemented as transistors), transistors M1, M2, and M3, capacitor C1, a digital buffer 164 and an AND gate 166 (or other type of logic gate). Current source 160 is coupled between $V_{DD}$ and the drain of transistor M1, and the source of M1 is coupled to capacitor C1. Capacitor C1 is coupled to M3 as shown. Switch SW2 is connected in parallel across capacitor C1 and thus, when closed bypasses (shorts) C1. The DIS signal controls switch SW2 (i.e., SW2 is open or closed depending the logic state of DIS). The gate of transistor M1 is coupled to a node designated as $V_{trip}$. $V_{trip}$ is provided to the input of the digital buffer 164, and the output of the digital buffer is provided to an input of AND gate 166. The DIS signal is provided to an inverting input of the AND gate 166. The output of the AND gate 166 represents $t_{on}$. The other current source 162 is coupled between $V_{DD}$ and the $V_{trip}$ node as is the case for switch S1. When closed, switch S1 pulls $V_{trip}$ up to $V_{DD}$. The DIS signal controls switch SW1 (i.e., SW1 is open or closed depending on the logic state of DIS). Current source 160 generates a current that is proportional to the input voltage $V_{in}$. Current source 162 generates a current that is proportion to the difference between the input and output voltages ($V_{in}$-$V_{out}$).

As noted above, the DIS signal is provided to an inverting input (due to the polarity of DIS) of the logic 166. The DIS signal also is used to open and close switches SW1 and SW2. When DIS is high (nominal state), the output of AND gate 166 is forced to be low. Further, with DIS high, switches SW1 and SW2 are in their closed (i.e., conducting) states and, as a result, capacitor C1 is shorted and $V_{trip}$ is pulled to $V_{in}$. When DIS is asserted low by DIS control 150 (triggered by receipt of clock signal from controller 102), switches SW1 and SW2 open. The output ($t_{on}$) of AND gate 166 goes high. With $V_{trip}$ being high, the gate of M1 is high. As a result of M1 being on, the current from current source 160 (current is proportion to $V_{in}$) flows through M1 into capacitor C1 and through C1 into M3. The purpose of M3 is to cancel the threshold voltage of M2. By canceling M2's threshold voltage, any additional voltage on node $V_x$ translates into squared current ($I_{sq}$) flowing out of M2. When $I_{sq}$ current equals the current of current source 162 (which is proportional to $V_{in}$-$V_{out}$), the voltage on the $V_{trip}$ node begins to fall to end the $t_{on}$ time. The $t_{on}$ time is generated by this circuit is proportion to the square root of the difference between $V_{in}$ and $V_{out}$ divided by $V_{in}$.

Figure 7:
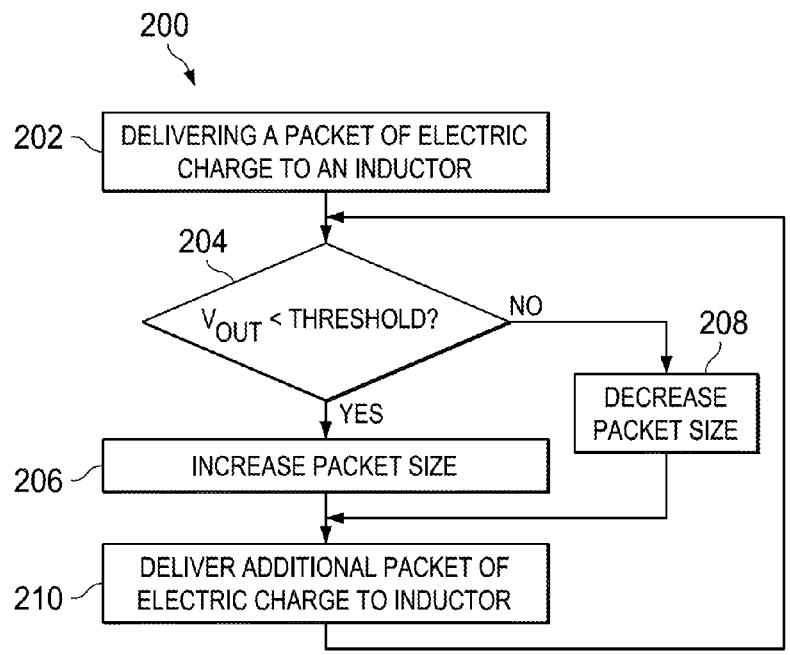
FIG. 7 shows a method in accordance with various examples.

FIG. 7 is a method in accordance with various embodiments. The depicted method may be performed by the voltage converter 100. At 202, the method includes delivering a first packet of electric charge via an inductor to an output capacitor. This operation may be performed by the controller 102 selectively enabling the HS switch and LS switch as described above. At 204, the method includes monitoring a magnitude of the output voltage $V_{out}$ of voltage converter 100 upon delivering the packet. As explained above, the controller 102 asserts a clock signal to the up/down counter 142 which results in a count value being incremented or decremented based on the magnitude of $V_{out}$ in relation to REF1.

If $V_{out}$ is less than REF1 (i.e., the output voltage ripple has not exceeded its maximum permitted value), then at 206, the packet size is increased. This operation is performed by generating a longer $t_{on}$ pulse as explained above. If $V_{out}$ is greater than REF1 (i.e., the output voltage ripple has exceeded its maximum permitted value), then at 210, the packet size is decreased. This operation is performed by generating a shorter $t_{on}$ pulse as explained above. In either case, the size of the packet of charge is adjusted, and a new packet of electric charge is delivered at 210 to the inductor L in accordance with the adjusted packet size.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A voltage converter, comprising:
    a high side transistor;
    a low side transistor coupled to the high side transistor at a switching node;
    an inductor coupled to the switching node and providing an output node;
        a controller coupled to the high side transistor and the low side transistor and configured to selectively turn on and off the high and low side transistors in an repeat cycle, and wherein the controller is configured to control the high and low side transistors to cause a sequence of packets of charge to be delivered via the inductor to an output capacitor; and an adaptive circuit coupled to the output node and the controller and configured to adaptively adjust the amount of charge in each packet based on the voltage of the output node;

wherein the adaptive circuit is configured to sample the voltage of the output node after the controller causes each packet to be delivered and to compare each such sample to a reference voltage to generate a comparison output signal;

wherein the adaptive circuit includes an up/down counter, and wherein, depending on a logic level of the comparison output signal, the comparison output signal causes the up/down counter to count up or down to generate a count output signal, the count output signal causing a change in a time length of a subsequent packet to thereby vary the amount of charge delivered by such subsequent packet.

2. A voltage converter, comprising:

a high side transistor;

a low side transistor coupled to the high side transistor at a switching node;

an inductor coupled to the switching node and providing an output node;

a controller coupled to the high side transistor and the low side transistor and configured to selectively turn on and off the high and low side transistors in an repeat cycle, and wherein the controller is configured to control the high and low side transistors to cause a sequence of packets of charge to be delivered via the inductor to an output capacitor; and an adaptive timer circuit coupled to the output node and the controller and configured to adaptively increase the amount of charge in each packet when the voltage of the output node is below a threshold and to decrease the amount of charge when the voltage of the output node is greater than a threshold;

wherein the adaptive timer circuit is configured to generate a voltage pulse having a time width, and wherein adaptive circuit is configured adjust the length of the time width based on a comparison of the voltage of the output node to a reference voltage;

wherein the adaptive timer circuit is configured to increase the length of the time width when the voltage of the output node is below the threshold and to decrease the time width when the voltage of the output node is greater than the threshold;

wherein the adaptive timer circuit includes an up/down counter, and wherein, depending on a logic level of the comparison output signal, the comparison output signal causes the up/down counter to count up or down to generate a count output signal, the count output signal causing a change in a time length of a subsequent packet to thereby vary the amount of charge delivered by such subsequent packet.

* * * * *